(12) United States Patent
Bowe

(10) Patent No.: US 7,067,561 B2
(45) Date of Patent: Jun. 27, 2006

(54) CATALYTIC PLANT AND PROCESS

(75) Inventor: Michael Joseph Bowe, Preston (GB)

(73) Assignee: GTL Microsystems AG, Baar (CH)

( * ) Notice: Subject to any disclaimer, the term of this patent is extended or adjusted under 35 U.S.C. 154(b) by 0 days.

(21) Appl. No.: 11/140,884

(22) Filed: Jun. 1, 2005

(65) Prior Publication Data

US 2005/0282918 A1    Dec. 22, 2005

(30) Foreign Application Priority Data

Jun. 16, 2004   (GB) ................................ 0413400.3

(51) Int. Cl.
| | |
|---|---|
| *C07C 27/00* | (2006.01) |
| *B01J 8/18* | (2006.01) |
| *B01J 10/00* | (2006.01) |
| *F27B 15/14* | (2006.01) |

(52) U.S. Cl. ...................... 518/706; 518/700; 518/712; 422/414; 422/146; 422/188

(58) Field of Classification Search ................ 518/700, 518/706, 712; 422/141, 146, 188
See application file for complete search history.

(56) References Cited

U.S. PATENT DOCUMENTS

| 6,211,255 B1 | 4/2001 | Schanke ...................... 518/715 |
| 2002/0143075 A1 | 10/2002 | Agee ........................... 518/710 |

FOREIGN PATENT DOCUMENTS

| WO | 03/033131 A1 | 4/2003 |
| WO | PCT/GB/03/05198 | 11/2003 |
| WO | 2004/050799 | 6/2004 |

*Primary Examiner*—J. Parsa
(74) *Attorney, Agent, or Firm*—William H. Holt

(57) ABSTRACT

Fischer-Tropsch synthesis is performed on a CO/H*2 feed gas using a plurality of compact catalytic reactor modules (12) each defining catalytic reaction channels and coolant channels, in two successive stages, with the same number of reactor modules for each stage. The gas flow velocity in the first stage is sufficiently high that no more than 75% of the CO undergoes conversion. The gases are cooled (16) between successive stages so as to remove water vapour, and the pressure is reduced (20) before they are subjected to the second stage. In addition the reaction temperature for the second stage is lower than for the first stage, such that no more than 75% of the remaining carbon monoxide undergoes conversion during the second stage too. The deleterious effect of water vapour on the catalyst is hence suppressed, while the overall capacity of the plant (10) can be adjusted by closing off modules in each stage while keeping the numbers equal.

8 Claims, 1 Drawing Sheet

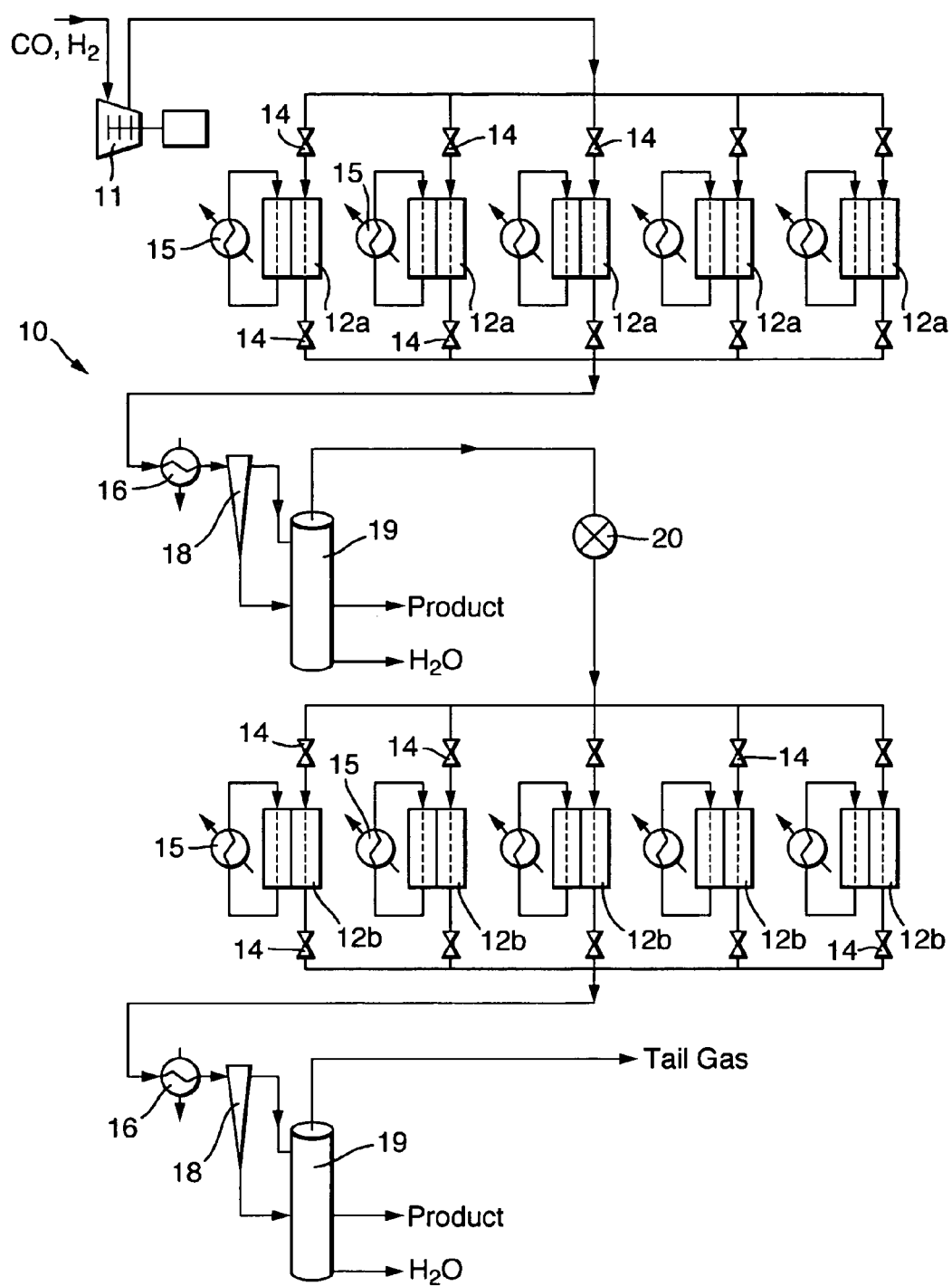

CATALYTIC PLANT AND PROCESS

BACKGROUND OF THE INVENTION

This invention relates to a chemical process, and to a catalytic reactor plant suitable for use in performing the process.

A process is described in PCT/GB 03/05198 (GTL Microsystems AG) in which Fischer-Tropsch synthesis is carried out in two successive stages, the two stages either occurring within a single reactor module which may have different numbers of channels, or alternatively there being different numbers of modules for the two stages. An improved way of performing this process has now been found.

SUMMARY OF THE INVENTION

According to the present invention there is provided a process for performing Fischer-Tropsch synthesis on a feed gas comprising carbon monoxide and hydrogen to generate a hydrocarbon product using a plurality of compact catalytic reactor modules each defining flow channels for the Fischer-Tropsch synthesis in which are gas-permeable catalyst structures, and adjacent flow channels for a heat transfer medium, wherein the Fischer-Tropsch synthesis is performed in at least two successive stages, and there are the same number of reactor modules for each of the successive stages, all the reactor modules providing identical flow channels, in the first stage the gas flow velocity being sufficiently high and the temperature sufficiently low that no more than 75% of the carbon monoxide undergoes conversion, the gases being cooled between successive stages so as to condense water vapour and some of the hydrocarbon product, and then being subjected to the second stage.

The temperature and pressure in the second stage may be different from that in the first stage in order to maintain acceptable levels of selectivity to C5+, and of CO conversion. For example, the pressure in the second stage may be lower as a result of pressure losses; this would reduce selectivity, and therefore the temperature may be reduced in the second stage as compared to the first stage, to attain the desired selectivity. The process therefore may also involve reducing the pressure of the reactant gases between successive stages, and the reaction temperature for the second stage being lower than for the first stage. The process may be performed such that no more than 85% of the remaining carbon monoxide undergoes conversion during the second stage.

Preferably in both the first stage and the second stage the space velocity is above 1000/hr, but preferably no greater than 15000/hr. Evidently the space velocity in the second stage is less than that in the first stage, because of the conversion to liquid during the first stage. Preferably the reactor is operated so that water vapour produced by the reaction does not exceed 26 mole % in either stage. Preferably, in the first stage, no more than 65% of the carbon monoxide undergoes conversion.

The space velocity, in this specification, is defined as the volume flow rate of the gases supplied to the reactor (measured at STP), divided by the void volume of the reactor. Thus, if the reactor is at 210° C. and a pressure of 2.5 MPa, a space velocity of 5000/hr corresponds to a gas flow (at operating conditions) of about 354 times the void volume per hour, and so to a residence time of about 10 s.

The invention also provides a plant for performing such a Fischer-Tropsch synthesis, comprising a plurality of compact catalytic reactor modules each defining flow channels for the Fischer-Tropsch synthesis in which are gas-permeable catalyst structures, and adjacent flow channels for a heat transfer medium, the reactor modules being arranged such that the Fischer-Tropsch synthesis occurs in at least two successive stages with the same number of reactor modules for each of the successive stages, all the reactor modules providing identical flow channels, the plant incorporating means to cool the reactant gases between successive stages so as to condense water vapour and some of the hydrocarbon product.

The condensation step between successive stages aims to cool the gases to a temperature in the range 40° to 100° C., depending on the cloud point of the hydrocarbon product, in order to avoid depositing wax on the heat transfer surfaces.

Preferably the temperature in the synthesis channels is above 190° C., at each stage. However at temperatures lower than about 204° C. there is a greater tendency to formation of wax (ie a long-chain product) and this has a tendency to adhere to the surface of the catalyst, which limits diffusion of reagents to the catalyst and lowers the rate of reaction. Conversely, at temperatures above about 225° C. the reaction tends to produce short-chain product and hence produces a higher proportion of methane. This lower-molecular weight material on the catalyst surface allows faster diffusion of reagents to the surface of the catalyst, and this accelerates the reaction rate and so generates more heat and still higher temperatures. Thus the temperatures for successive stages may be different, but should preferably lie in the range between about 204° C. and 225° C., and more preferably between about 204° C. and 210° C.

The invention will now be further and more particularly described, by way of example only, and with reference to the accompanying drawing:

BRIEF DESCRIPTION OF THE DRAWING

FIG. 1 shows a flow diagram of a plant for performing Fischer-Tropsch synthesis.

DETAILED DESCRIPTION OF THE INVENTION

The invention relates to Fischer-Tropsch synthesis, which may form part of a process for converting methane to longer chain hydrocarbons. Fischer-Tropsch synthesis is a reaction between carbon monoxide and hydrogen, and this gas mixture may for example be generated by steam/methane reforming. In Fischer-Tropsch synthesis the gases react to generate a longer chain hydrocarbon, that is to say:

$$n\ CO + 2n\ H_2 \rightarrow (CH_2)_n + n\ H_2O$$

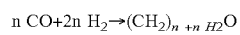

which is an exothermic reaction, occurring at an elevated temperature, typically between 190° and 350° C., for example 210° C., and an elevated pressure typically between 2 MPa and 4 MPa, for example 2.5 MPa, in the presence of a catalyst such as iron, cobalt or fused magnetite, with a potassium promoter. The exact nature of the organic compounds formed by the reaction depends on the temperature, the pressure, and the catalyst, as well as the ratio of carbon monoxide to hydrogen.

A preferred catalyst comprises a coating of lanthanum-stabilised gamma-alumina of specific surface area 140–450 $m^2/g$ with about 10–40% (by weight compared to the weight of alumina) of cobalt, and with a ruthenium/platinum promoter, the promoter being between 0.01% to 10% of the weight of the cobalt. There may also be a basicity promoter such as gadolinium oxide. The activity and selectivity of the catalyst depends upon the degree of dispersion of cobalt metal upon the support, the optimum level of cobalt dispersion being typically in the range 0.1 to 0.2, so that between 10% and 20% of the cobalt metal atoms present are at a surface. The larger the degree of dispersion, clearly the smaller must be the cobalt metal crystallite size, and this is typically in the range 5–15 nm. Cobalt particles of such a size provide a high level of catalytic activity, but may be oxidised in the presence of water vapour, and this leads to a dramatic reduction in their catalytic activity. The extent of this oxidation depends upon the proportions of hydrogen and water vapour adjacent to the catalyst particles, and also their temperature, higher temperatures and higher proportions of water vapour both increasing the extent of oxidation.

A reactor module suitable for use in a Fischer-Tropsch plant comprises a stack of plates defining coolant channels alternating with reaction channels, and with gas-permeable catalyst structures (such as corrugated foil, felt or mesh) in the reaction channels. The plates may be flat, and the channels defined by grooves; alternatively some of the plates may be corrugated or castellated so as to define channels. The plates are bonded together typically by diffusion bonding or brazing, and are provided with suitable headers for the reactant gases and the coolant. For example, corrugated Fecralloy alloy foils 50 μm thick coated with a ceramic coating impregnated with a catalyst material may then be inserted into the reaction channels before the headers are attached, and can be replaced if the catalyst becomes spent. In a practical plant it is desirable for all the reactor modules to be of the same structure and size, so they are identical. Indeed, one benefit of standardisation is that it may reduce the capital cost of the plant.

Referring now to FIG. 1, a Fischer-Tropsch plant 10 receives a gas flow of carbon monoxide and hydrogen supplied via a compressor 11 at a pressure of 2.1 MPa. The plant comprises ten identical reactor modules: five modules 12a through which the flows are in parallel, these constituting the first stage, and another five modules 12b through which the flows are in parallel and which constitute the second stage. Valves 14 enable the flow through each module 12a or 12b to be turned on or off, and the modules 12a or 12b to be isolated.

Between the first stage and the second stage the gas mixture is passed through a heat exchanger 16 arranged to condense water vapour and longer chain hydrocarbons, and so remove them from the flowing gases. The cooled gas mixture is then passed through a separator, such as a cyclone separator 18, followed by a separating chamber 19 in which the three phases water, hydrocarbons, and unreacted gases separate. The gases are passed on to the second stage of the plant 10 through a pressure reduction valve 20 so that the reaction pressure in the second stage can be reduced, typically to a pressure in the range 1.6–2.0 MPa.

The reaction temperature is controlled by provision of coolant to the coolant channels within each module 12, the coolant in each case being recirculated through a respective heat exchanger 15. The flow rate of the coolant is adjusted to ensure that the coolant temperature changes by no more than 10° C. on passage through the module 12. The reaction temperature in the second stage may be controlled to be less than that in the first stage. This may be achieved by using different coolant circuits 15 for each module 12a or 12b, as shown. Alternatively the same coolant might be provided successively through both stages, but have its temperature decreased between one stage and the next. Preferably the reaction temperature in the second stage is about 5° C. or 10° C. less than that in the first stage.

After the second stage the gas flow is passed through another heat exchanger 16 arranged to condense water vapour and longer chain hydrocarbons. The cool gas mixture is then passed through a separator, for example a second cyclone separator 18, followed by a second separating chamber 19 in which the three phases water, hydrocarbons, and unreacted gases separate. The resulting tail gases are typically rich in hydrogen, and may be flared, or used to provide fuel for a catalytic combustion process, or fuel for a gas turbine (not shown).

In use of the plant 10 the mixture of carbon monoxide and hydrogen is supplied to the first stage reactor modules 12a at a pressure of for example 2.1 MPa, where Fischer-Tropsch synthesis occurs. The coolant flows in co-current through the coolant channels in each module 12, to maintain the temperature within each reactor module 12a at a value in the range between 205° and 220° C., the temperature varying by no more than +/−5° C. along the length of the reactor channel. (In practice the coolant may follow a serpentine path along a succession of transverse ducts, the serpentine path approximating to co-current flow.) The intention is to approach isothermal conditions throughout the reactor 10; this has the advantage of minimising the risk of any wax (i.e. very long chain hydrocarbon) blocking the flow channels towards the outlet from the reaction channels. The flow rate (space velocity) of the reacting gases in the reactor modules 12a is in the range 4000-7000/hr, for example about 6500/hr, ensuring that the conversion of carbon monoxide is in the range 35% to 70% by the time the gases leave the first stage.

Water vapour (and some of the longer-chain hydrocarbons) condenses on passage through the heat exchanger 16, and any liquid droplets are removed from the gas phase by passage through the separator 18 and the chamber 19. This significantly reduces the partial pressure of water vapour in the gas mixture that flows on into the second stage.

The remaining gases may be reduced in pressure by the valve 20 before being fed to the reactor modules 12b of the second stage. In the modules 12b the gases again undergo Fischer-Tropsch synthesis, but the coolant temperature is arranged to maintain the temperature within each module 12b at a temperature which may be a few degrees, for example about 5° to 10° C., below that in the first stage. It will be appreciated that because a significant proportion of the gases have become hydrocarbons on passage through the first stage modules 12a, inevitably the space velocity will be less in the second stage, typically in the range 2000–4000/hr. Nevertheless, by decreasing the pressure and decreasing the reaction temperature in the modules 12b (as compared to those of the first stage), the conversion of carbon monoxide on passage through the modules 12b and the selectivity to C5+ are maintained so that the total conversion of CO is over 85% (over the two stages) and the overall selectivity to C5+ is maintained in the range 75–95%. For example the conversion in the first stage may be 40%, generating about 11% water vapour; and the conversion in the second stage may be 82% (of the remaining CO), giving about 25% water vapour.

Removal of the water vapour and the lower boiling point hydrocarbons on passage through the separator 18 and chamber 19 before reaching the second stage modules 12b not only lowers the partial pressure of water vapour and so suppresses the oxidation of the catalyst, but has the further benefit of removing at least some of those hydrocarbons that would form a liquid layer on the catalyst structure. Any such a liquid layer inhibits contact of the gas mixture with the catalyst particles and inhibits diffusion of the product hydrocarbons away from the catalyst particles, so removal of the hydrocarbons liquid minimises these diffusional resistances.

If the feed gas flow rate decreases, the reaction conditions (that is to say the space velocity, temperature and pressure) can be maintained substantially constant in each of the stages by closing down the same number of modules 12a and 12b in each stage, using the valves 14. The number of first stage reactor modules 12a that are in use should always be equal to the number of second stage reactor modules 12b that are in use. Hence the plant 10 can be decreased in capacity down to 20% of its design capacity without any significant change in the operating conditions. This enables the process to be varied so as to match variations in the supply of natural gas over time, without disturbing the operating conditions within the Fischer-Tropsch modules; such disturbances can lead to catalyst damage, as excessively low space velocity leads to overconversion of CO and consequential high water vapour partial pressure, and the catalyst can suffer oxidation or an irreversible reaction with the ceramic support in the presence of water vapour.

It will be appreciated that the invention is not limited to a two-stage process, as the process may be arranged to provide three or more Fischer-Tropsch reaction stages, with a corresponding increased number of inter-stage cooling and separation units. For example there might be four successive stages each with say five reactor modules 12; because there are more stages, the conversion in any one stage may be limited to a lower value, such as 20%, while still obtaining a good overall conversion from the plant. This much lower value of conversion further reduces the concentration of water vapour to which the catalyst is exposed, and consequently a more active catalyst may be utilised (which is more susceptible to damage from elevated water vapour pressure), and a higher space velocity may be used. Furthermore, the pressure may be increased between successive stages (rather than being reduced as described above).

I claim:

1. A process for performing Fischer-Tropsch synthesis on a feed gas comprising carbon monoxide and hydrogen to generate a hydrocarbon product using a plurality of compact catalytic reactor modules each comprising a stack of plates defining flow channels for the Fischer-Tropsch synthesis in which are gas-permeable catalyst structures, and adjacent flow channels for a heat transfer medium, wherein the Fischer-Tropsch synthesis is performed in at least two successive stages, each stage being carried out in a plurality of reactor modules through which reactant gas flows are in parallel, and there are the same number of reactor modules for each of the successive stages, all the reactor modules providing identical flow channels, in the first stage the gas flow velocity being sufficiently high and the temperature sufficiently low that no more than 75% of the carbon monoxide undergoes conversion, the gases being cooled between successive stages so as to condense water vapour and some of the hydrocarbon product, and then being subjected to the second stage.

2. A process as claimed in claim 1 wherein both the first stage and the second stage occur at temperatures in the range 204° C. to 225° C.

3. A process as claimed in claim 1 wherein water vapour does not exceed 26 mole %.

4. A process as claimed in claim 1 wherein, in at least the first stage, no more than 65% of the carbon monoxide undergoes conversion.

5. A process as claimed in claim 1 wherein the pressure reduction between successive stages is between 0.1 MPa and 0.5 MPa.

6. A plant for performing Fischer-Tropsch synthesis on a teed gas comprising carbon monoxide and hydrogen to generate a hydrocarbon product, comprising a plurality of compact catalytic reactor modules each comprising a stack of plates defining flow channels for the Fischer-Tropsch synthesis in which are gas-permeable catalyst structures, and adjacent flow channels for a heat transfer medium, the reactor modules being arranged such that the Fischer-Tropsch synthesis occurs in at least two successive stages, there being a plurality of said reactor modules arranged for parallel flows of reactant gases for each stage, with the same number of reactor modules for each of the successive stages, all the reactor modules providing identical flow channels, the plant incorporating means to cool the reactant gases between successive stages so as to condense water vapour and some of the hydrocarbon product.

7. A plant as claimed in claim 6 wherein there are five reactor modules for each stage.

8. A plant as claimed in claim 6 wherein each reactor module is provided with isolation valves whereby the number of reactor modules utilized for the reaction in each stage can be adjusted in accordance with the reed gas flow rate.

* * * * *